US012751371B2

(12) United States Patent
Beelaert et al.

(10) Patent No.: US 12,751,371 B2
(45) Date of Patent: Oct. 6, 2026

(54) AGRICULTURAL VEHICLE WITH FLOATING GUIDANCE PLATE

(71) Applicant: CNH Industrial America LLC, New Holland, PA (US)

(72) Inventors: Simon Beelaert, Adegem (BE); Jeffrey Blancke, Markegem (BE); Stijn Van Belleghem, Maldegem (BE)

(73) Assignee: CNH Industrial America LLC, New Holland, PA (US)

(*) Notice: Subject to any disclaimer, the term of this patent is extended or adjusted under 35 U.S.C. 154(b) by 334 days.

(21) Appl. No.: 18/284,826

(22) PCT Filed: Mar. 30, 2022

(86) PCT No.: PCT/EP2022/058479
§ 371 (c)(1),
(2) Date: Sep. 28, 2023

(87) PCT Pub. No.: WO2022/207745
PCT Pub. Date: Oct. 6, 2022

(65) Prior Publication Data

US 2024/0172593 A1 May 30, 2024

(30) Foreign Application Priority Data

Mar. 31, 2021 (EP) .................................... 21166399

(51) Int. Cl.
*A01F 15/08* (2006.01)
*A01D 89/00* (2006.01)

(52) U.S. Cl.
CPC ............ *A01D 89/008* (2013.01); *A01F 15/08* (2013.01)

(58) Field of Classification Search
CPC ....... A01D 89/008; A01D 57/26; A01D 57/28
See application file for complete search history.

(56) References Cited

U.S. PATENT DOCUMENTS 4,035,999 A 7/1977 Crane et al.
7,730,704 B2 6/2010 Viaud
(Continued)

FOREIGN PATENT DOCUMENTS

EP 0070942 A1 2/1983
EP 1252813 A1 10/2002
(Continued)

OTHER PUBLICATIONS

European Office Action for European Application No. 21166399.2 dated Sep. 24, 2021 (Sep. 24, 2021)—6 pages.
(Continued)

*Primary Examiner* — Cathleen R Hutchins
(74) *Attorney, Agent, or Firm* — CM Law PLLC; Stephen J. Weed

(57) ABSTRACT

A pickup assembly (10) for an agricultural vehicle (1), in particular a forage harvester or a baler, includes: a frame (200); a pickup drum (210) carried by the frame (200) and carrying a plurality of tines (211); and a windguard assembly (220) carried by the frame (200) and including a roller (221) carried in front of the pickup drum (210) and defining a roller axis (RA). A guidance plate (230) is provided that is pivotable about a pivot axis (PA) that is coaxial with the roller axis (RA).

15 Claims, 7 Drawing Sheets

(56) References Cited

U.S. PATENT DOCUMENTS

| | | | | |
|---|---|---|---|---|
| 2006/0277888 | A1* | 12/2006 | Erdmann ............. | A01D 89/008 56/344 |
| 2007/0119140 | A1* | 5/2007 | Gette ................... | A01D 89/008 56/364 |
| 2008/0141642 | A1* | 6/2008 | Viaud .................. | A01D 89/008 56/344 |
| 2009/0100814 | A1 | 4/2009 | Egging et al. | |
| 2013/0000497 | A1* | 1/2013 | Posselius ............ | A01F 15/0825 100/40 |

FOREIGN PATENT DOCUMENTS

| | | | |
|---|---|---|---|
| EP | 1621068 | A1 | 2/2006 |
| EP | 2689653 | A1 | 1/2014 |
| EP | 2674022 | B1 | 8/2015 |
| EP | 2674023 | B1 | 6/2017 |
| EP | 3078255 | B1 | 1/2018 |
| WO | 2012136515 | A1 | 10/2012 |

OTHER PUBLICATIONS

International Search Report and Written Opinion for International Application No. PCT/EP2022/058479, dated Aug. 2, 2022 (Feb. 8, 2022)—11 pages.

* cited by examiner

AGRICULTURAL VEHICLE WITH FLOATING GUIDANCE PLATE

BACKGROUND OF THE INVENTION

The present invention relates to agricultural vehicles and, more particularly, to pickup assemblies for agricultural vehicles.

Certain agricultural machines, such as forage harvesters, forage wagons and balers, are required to collect crop material, that has been cut, from the field. The component of such agricultural machines which gathers the crop material and feeds it further into the machine for processing is generally known as a pickup assembly. A pickup assembly typically comprises a pickup drum rotatably mounted on a frame, with radially arranged projecting tines to collect the crop material and propel it upwards, past a guiding element and then into a feed channel through which the crop material is conveyed into the machine for subsequent processing, such as baling, threshing, chopping, storing and/or depositing. This guiding element is generally referred to as a windguard, and serves the purposes of restricting the movement of the collected crop material in the forward and upward direction, shielding the crop flow path from wind influence and guiding the crop material efficiently into the feed channel.

Known windguard designs may be as simple as a deflector, e.g. comprising a flat sheet metal plate or an arrangement of such plates. Alternatively, a windguard may comprise a roller extending transversely across the width of the pick-up assembly located above and forward of the pick-up drum. Such roller, which can for example be rotatably mounted at its opposite ends on two support arms, may guide the crop material more efficiently along a well-defined crop flow path compared to a simple deflector, e.g. with reduced resistance to crop flow. The support arms are typically pivotable relative to the frame of the pick-up assembly so that the gap between the roller and the pick-up drum may increase as the flow of crop material increases. Some known windguards utilize two rollers: a front roller that rolls over crop material to compress it slightly for smooth pickup by the tines and a rear roller that guides crop material toward the feed channel. Known windguards with two rollers are prone to various issues, such as crop material getting stuck in between during feeding or the mat of crop gets too dense to be handled efficiently by the crop material conveyor.

What is needed in the art is a pickup assembly that addresses some of the previously described issues of known pickup assemblies.

SUMMARY OF THE INVENTION

The present invention provides a windguard assembly with a roller defining a roller axis and a guidance plate that is pivotable about a pivot axis that is coaxial with the roller axis.

In some exemplary embodiments provided according to the present disclosure, a pickup assembly for an agricultural vehicle, in particular a forage harvester or a baler, includes: a frame; a pickup drum carried by the frame and carrying a plurality of tines; and a windguard assembly carried by the frame and including a roller carried in front of the pickup drum and defining a roller axis. The pickup assembly also includes a guidance plate that is pivotable about a pivot axis that is coaxial with the roller axis.

In some embodiments, the guidance plate is coupled to the frame.

In some embodiments, the pickup assembly includes a plate resistor that is coupled to the guidance plate and configured to resist pivoting of the guidance plate about the pivot axis.

In some embodiments, the plate resistor couples the guidance plate to the frame.

In some embodiments, the plate resistor includes a hydraulic cylinder and/or a spring.

In some embodiments, a pivot pin extends along the roller axis and the guidance plate is pivotably coupled to the pivot pin.

In some embodiments, an arm is coupled to the frame and includes a pin opening in which the pivot pin is partially disposed.

In some embodiments, at least one stop is included that is configured to stop pivoting of the guidance plate at a minimum pivoting position and/or a maximum pivoting position.

In some embodiments, a stop actuator movably couples the at least one stop to the frame and is configured to move the stop relative to the frame and adjust the minimum pivoting position and/or the maximum pivoting position.

In some embodiments, a controller is included that is configured to output a stop adjustment signal causing the stop actuator to move the at least one stop.

In some embodiments, the pickup assembly includes: a pressure sensor associated with the pickup drum, operably coupled to the controller, and configured to output a pressure signal corresponding to a pressure on the pickup drum to the controller; and/or an angle sensor associated with the guidance plate, operably coupled to the controller, and configured to output a plate angle signal corresponding to an angle of the guidance plate. The controller is configured to receive the pressure signal and/or the plate angle signal and output the stop adjustment signal based at least partially on the received pressure signal and/or plate angle signal.

In some embodiments, the guidance plate has a roughened surface facing the tines.

In some exemplary embodiments provided according to the present disclosure, an agricultural vehicle includes a chassis, a crop material conveyor carried by the chassis, and the previously described pickup assembly carried by the chassis and configured to move crop material from the ground toward the crop material conveyor. The guidance plate is configured to direct crop material that is picked up by the tines towards the crop material conveyor.

In some embodiments, the crop material conveyor is an auger.

In some embodiments, the agricultural vehicle is a forage harvester, a large square baler, a small square baler, or a round baler.

A possible advantage that may be realized by exemplary embodiments provided according to the present disclosure is that the guidance plate can be adjusted to provide a smooth flow path of crop material from the tines to the crop material conveyor.

Another possible advantage that may be realized by exemplary embodiments provided according to the present disclosure is that the guidance plate can have a roughened surface to help prevent the risk of crop material getting stuck on the tines.

Yet another possible advantage that may be realized by exemplary embodiments provided according to the present disclosure is that one or more stops may be adjusted, based on harvesting conditions or otherwise, to adjust the pivoting behavior of the guidance plate and corresponding crop flow material characteristics.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
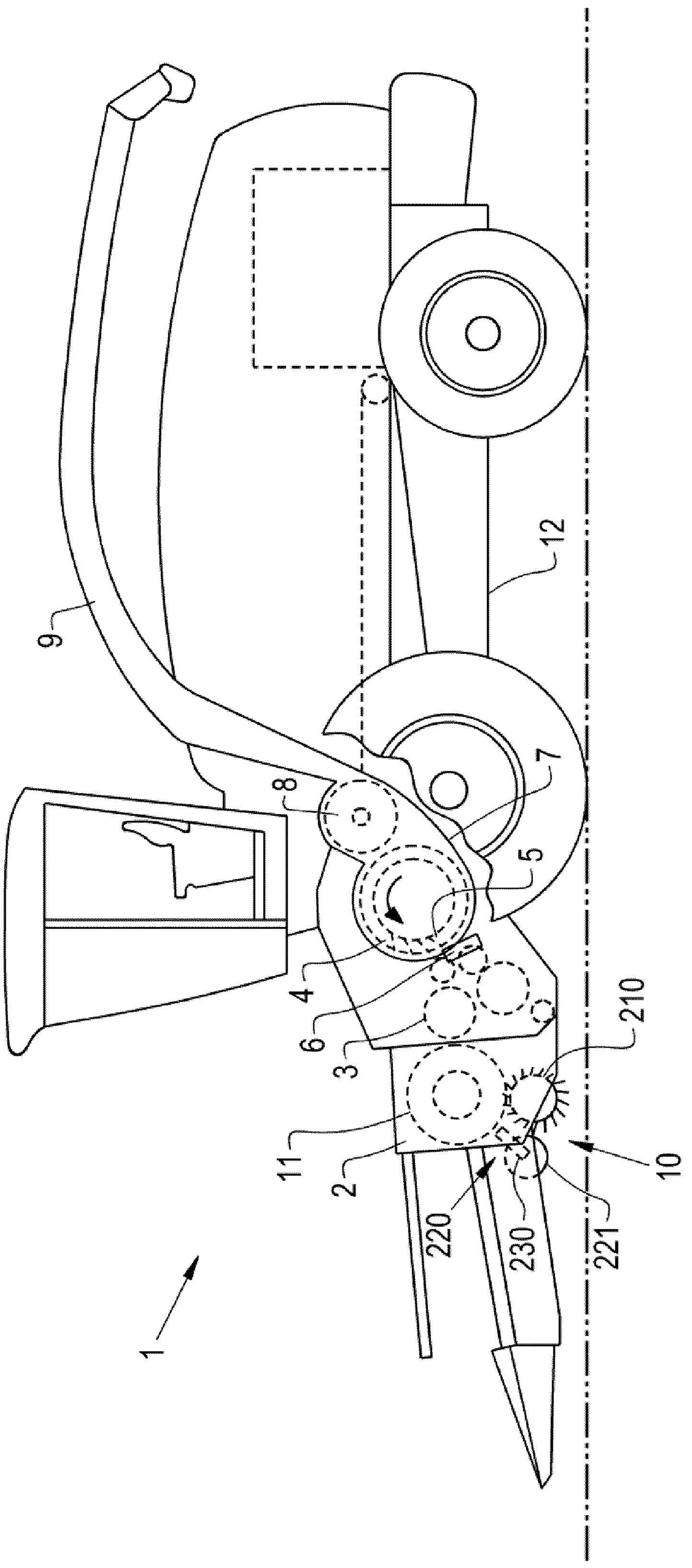
FIG. 1 is a side view of an exemplary embodiment of an agricultural vehicle, illustrated in the form of a forage harvester, provided according to the present disclosure.

FIG. 1 shows a schematic side view of an exemplary embodiment of an agricultural vehicle, illustrated in the form of a forage harvester 1. As the harvester 1 advances through a field, crops are gathered by a header 2, e.g. in the form of a grass pickup unit, and transported to a central area of the header 2 where the crops enter the forage harvester through a set of feed rolls 3. The rolls 3 guide the crops in the form of a mat with a given thickness towards the cutting drum 4, which rotates in the direction indicated by the arrow, about a rotation axis that is transversal to the direction of movement of the crops. Knives 5 are mounted on the drum 4 (only four are shown, the knives 5 are distributed along the full circumference of the drum 4), so that the knives 5 pass by a stationary shear bar 6 as the drum 4 rotates, thereby chopping the crops into small pieces which are further transported between the cutting drum 4 and a concave 7. The chopped material is then ejected by a blower 8 through a spout 9. The harvester 1 includes a pickup assembly 10 that picks up crop material and moves it toward a crop material conveyor 11, illustrated in the form of an auger. The harvester 1 also includes a chassis 12, which carries the components of the harvester 1. It should be appreciated that while the agricultural vehicle 1 is illustrated and described as a forage harvester, in some embodiments the agricultural vehicle is in the form of other agricultural vehicles such as a baler, e.g., a large square baler, a small square baler, or a round baler.

Referring now to FIGS. 2-5, the pickup assembly 10 and material conveyor 11 are illustrated in further detail. The pickup assembly 10 includes a pickup drum 210 that rotatably carries a plurality of tines 211 about a pickup axis of rotation PAR. The pickup drum 210 is carried by a frame 200, which may be a part of the chassis 12 or carried by the chassis 12. The tines 211 pickup crop material from the ground during rotation and move the picked up crop material toward the crop material conveyor 11, which may be an auger or other type of conveyor suitable for conveying crop material. The crop material conveyor 11 can convey the picked up crop material toward an interior of the harvester 1, or to a central location where a separate conveyor conveys the crop material toward the interior of the harvester 1. It should be appreciated that many different suitable constructions of pickup drums and crop material conveyors are known, so further description is omitted for brevity.

The pickup assembly 10 also includes a windguard assembly 220. The windguard assembly 220 includes a roller 221. The roller 221 defines a roller axis RA, which the roller 221 rotates about during operation. In the case of a cylindrical roller 221, the roller axis RA may be defined through the geometric center of a circular cross-section of the roller 221. It should be appreciated that while the roller 221 is illustrated and described as a cylindrical roller, the roller 221 can be formed to have other shapes. The roller 221 may be a fixed roller, i.e., a roller that generally maintains a fixed position of the roller axis RA during operation, or an adjustable roller, i.e., a roller that can be appreciably repositioned so the roller axis RA moves.

In known windguard assemblies, which may have two rollers to guide crop material towards the crop material conveyor, an opening is created between the two rollers. The front roller rolls on top of a swath of crop material as it is being collected while the rear roller is positioned above the tines to guide the crop material toward the crop material conveyor when it is picked up. When crop material is picked up by the tines, it is pushed inside the opening between the two rollers, which creates an obstacle for the rear roller as the crop is pushing in an opposite direction of the rotation of the rear roller. The effect of this obstacle can slow down or even prevent rotation of the rear roller in some conditions, which has a negative influence on crop material flow into the harvester.

To address some of the previously described issues with known windguard assemblies, the pickup assembly 10 provided according to the present disclosure includes a guidance plate 230 that is pivotable about a pivot axis PA that is coaxial with the roller axis RA about which the roller 221 rotates. As illustrated, the guidance plate 230 may be disposed so a first end section 231 is disposed in proximity to the crop material conveyor 11 and a second end section 232 is disposed in proximity to the roller axis RA. The guidance plate 230 may have a roughened surface 233 that faces the tines 211, which encourages crop material carried by the tines 211 being dislodged from the tines 211 and being fed easier to the crop material conveyor 11. In some embodiments, the roughened surface 233 is textured, which may be a result of sanding and/or providing ribs on the roughened surface 233.

The guidance plate 230 may be shaped and positioned so the guidance plate 230 is positioned close to an outside surface of the roller 221 and there is a smooth transfer of crop material from the roller 221 to the guidance plate 230. The first end section 231 of the guidance plate may be positioned close to an outside diameter of the crop material conveyor 11, such as an outer diameter of the auger 11, while still being pivotable through a range of pivotable motion, as will be described further herein. The weight of the guidance plate 230 allows the guidance plate 230 to apply some pressure on the crop material passing underneath it, which creates a compact smooth layer of crop material that is directed to the crop material conveyor 11.

Figure 2:
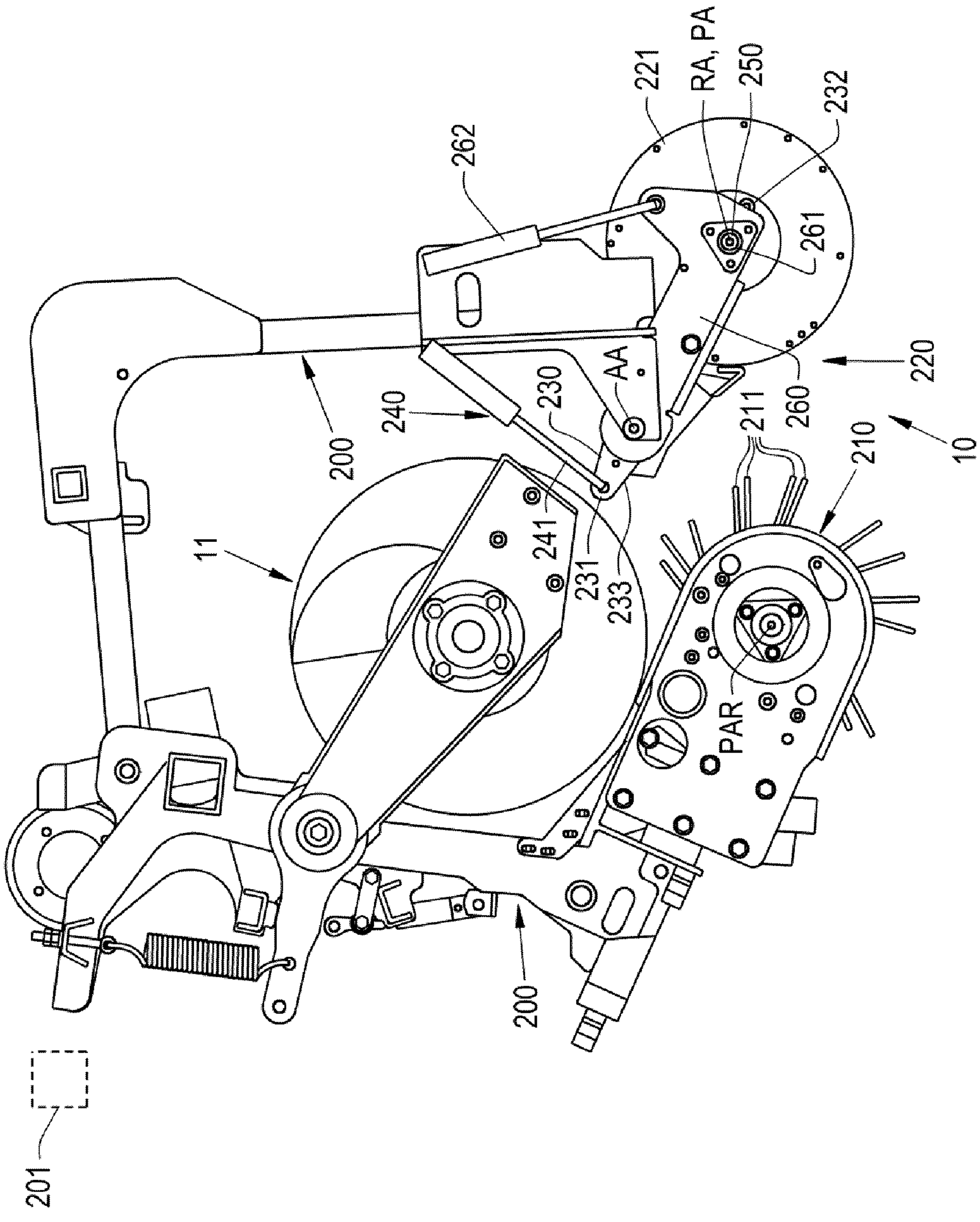
FIG. 2 is a side view of a material conveyor and a pickup assembly of the agricultural vehicle illustrated in FIG. 1 including a roller and a guidance plate, provided in accordance with the present disclosure.
Figure 3:
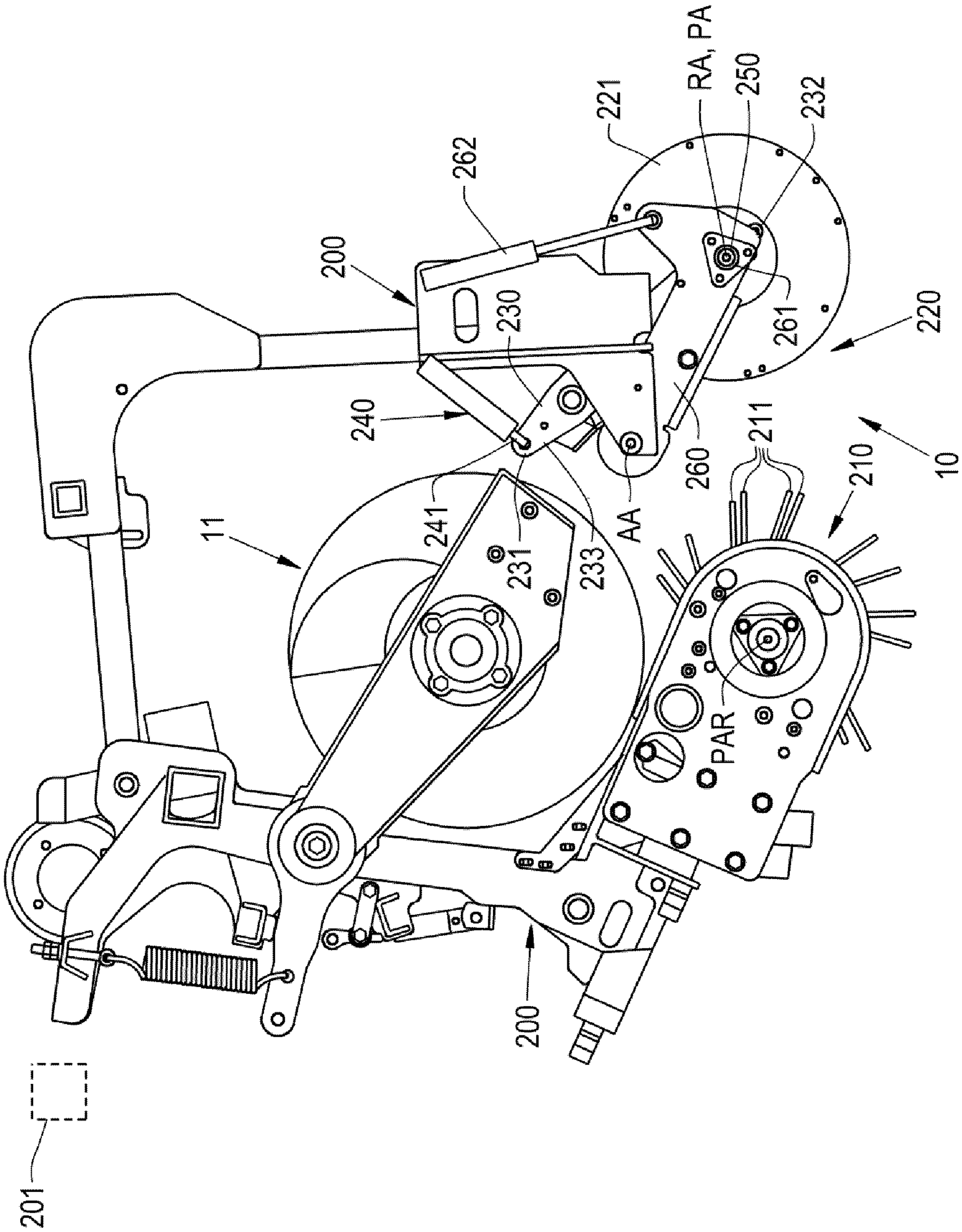
FIG. 3 is a side view of the pickup assembly and material conveyor illustrated in FIGS. 1 and 2 after the guidance plate has been pivoted.
Figure 4:
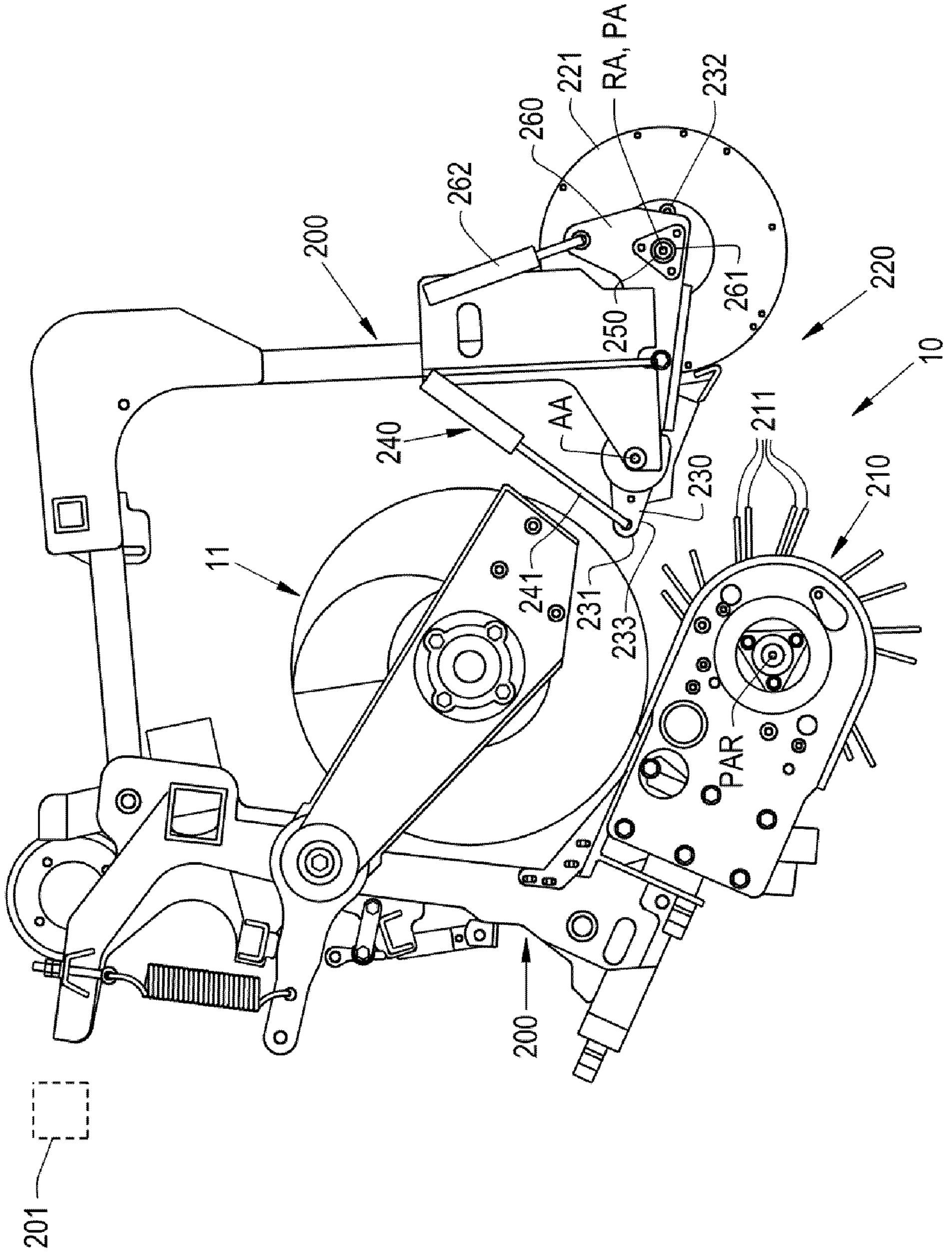
FIG. 4 is a side view of the material conveyor and the pickup assembly illustrated in FIGS. 1-3 after the roller has been pivoted.
Figure 5:
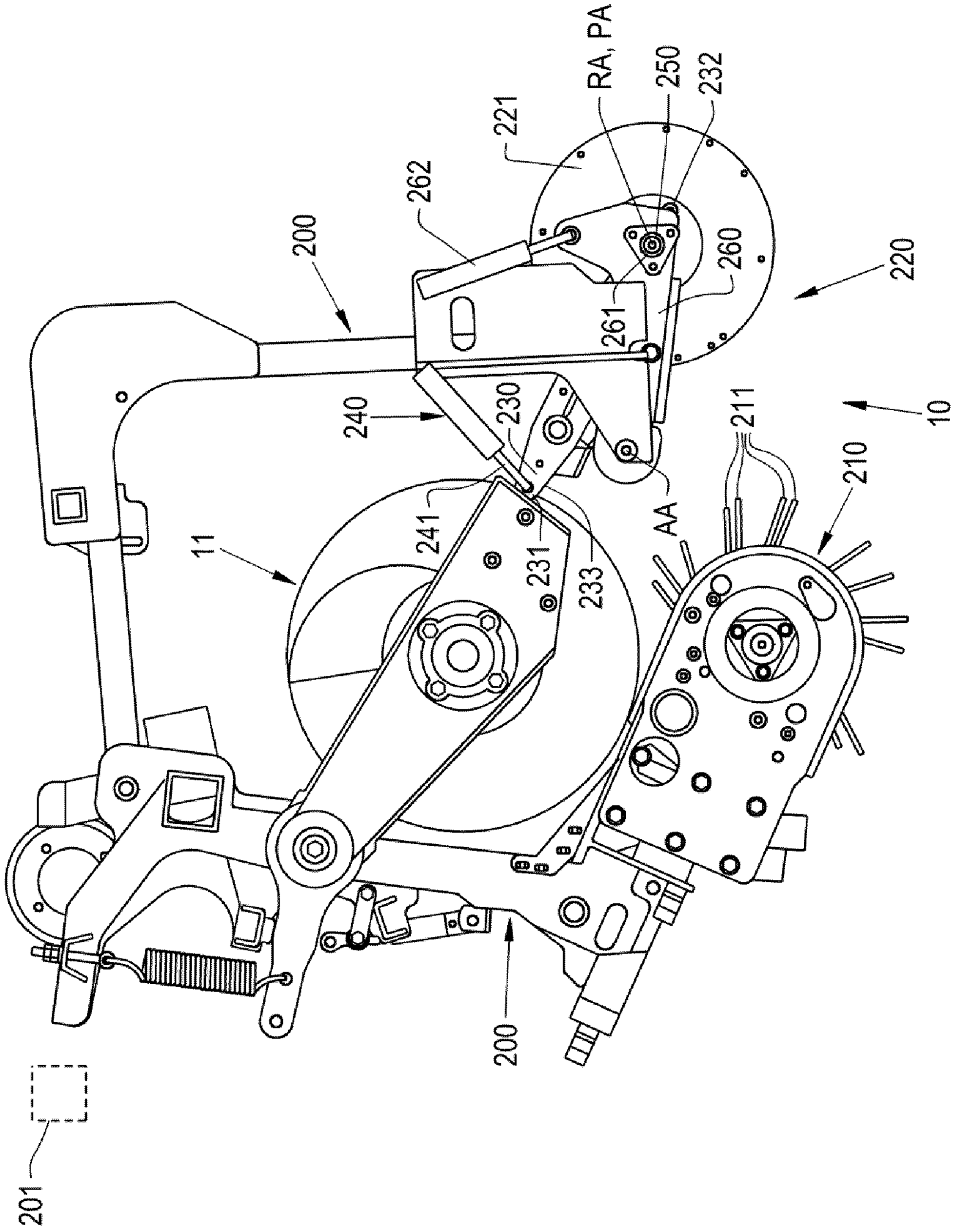
FIG. 5 is a side view of the material conveyor and the pickup assembly of FIG. 4 after the guidance plate has been pivoted.

As can be seen in comparing FIGS. 2-3, the guidance plate 230 is pivotable about the pivot axis PA between differing positions. Pivoting of the guidance plate 230 about the pivot axis PA may generally be due to incoming crop material pushing up on the guidance plate 230 as the crop material is fed towards the crop material conveyor 11. In some embodiments, a plate resistor 240 is coupled to the guidance plate 230 and configured to resist pivoting of the guidance plate 230 about the pivot axis PA. The plate resistor 240 may couple the guidance plate 230 to the frame 200. The plate resistor 240 can increase the force required to pivot the guidance plate 230, which generally comes from incoming crop material, and can thus also increase the maximum pressure that the guidance plate 230 may exert on incoming crop material.

The plate resistor 240 may comprise a selectively activated resistor, such as a hydraulic cylinder as illustrated, and/or a passive resistor, such as a spring. As can be appreciated from FIGS. 2-3, the plate resistor 240, when in the form of a hydraulic cylinder, can couple to the guidance plate 230 via a cylinder rod 241 that is coupled to the first end section 231 of the guidance plate 230. The plate resistor 240 may be operably coupled to a controller 201, which can be controlled by a user, to selectively set the force exerted by the plate resistor 240 on the guidance plate 230. The controller 201 may, for example, be controlled to output a plate resistance signal that causes the plate resistor 240 to increase or decrease the force exerted on the guidance plate 230 to cause a corresponding increase or decrease in the force necessary for incoming crop material to pivot the guidance plate 230. For example, the output plate resistance signal may cause the plate resistor 240, if in the form of a hydraulic cylinder, to increase a fluid pressure inside the hydraulic cylinder, which increases the pressure exerted on the guidance plate 230. The controller 201 may be configured to output the plate resistance signal responsively to an input command from a user and/or automatically in response to various measured parameters. The controller 201 may output the plate resistance signal responsively to, for example, receiving an input signal from a device within an operator cab of the vehicle 1 and/or receiving the input signal from an application on a remote device, such as a smartphone. It should thus be appreciated that the plate resistor 240, if in the form of a selectively activated resistor such as a hydraulic cylinder, may be controlled in a variety of ways to adjust the maximum pressure exerted by the guidance plate 230 on incoming crop material.

In some embodiments, a pivot pin 250 extends along the roller axis RA defined by the roller 221. In some embodiments, the pivot pin 250 defines the roller axis RA so the roller 221 rotates about the pivot pin 250. The guidance plate 230 may be pivotably coupled to the pivot pin 250 so the pivot pin 250 also defines the pivot axis PA, i.e., the guidance plate 230 may pivot about the pivot pin 250. In some embodiments, an arm 260 is coupled to the frame 200 and includes a pin opening 261 in which the pivot pin 250 is partially disposed. The arm 260 may be movably coupled to the frame 200, such as pivotably coupled, so the roller axis RA and the pivot axis PA can be adjusted together. For example, an arm actuator 262 may couple the arm 260 to the frame 200 so the arm 260 may pivot about an arm pivot axis AA, as can be appreciated from FIGS. 4-5. As can be appreciated from FIGS. 2-3, the guidance plate 230 can be pivoted independently of the arm 260, i.e., without adjusting the position of the roller axis RA and the pivot axis PA, so pivoting of the guidance plate 230 due to incoming crop material does not undesirably affect the position of the arm 260. It should be appreciated that while the arm 260 is illustrated as being movable to adjust the position of the roller axis RA of the roller 221, in some embodiments movement of the arm 260 does not adjust the position of the roller axis RA of the roller 221 and/or the roller 221 is a fixed roller, as described previously.

Figure 6:
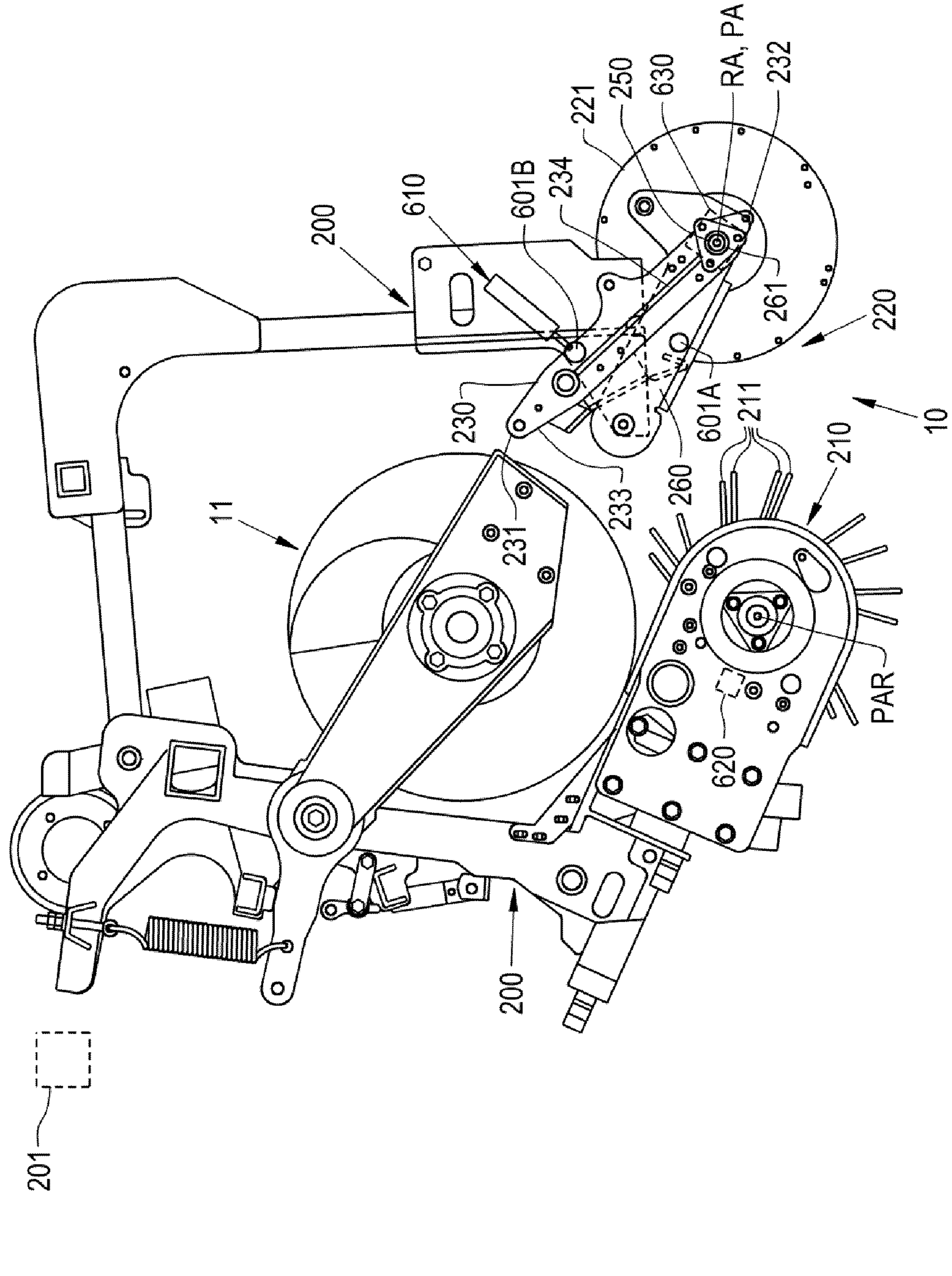
FIG. 6 is a side view of the material conveyor and the pickup assembly of FIGS. 1-4 illustrating stops that can limit pivoting of the guidance plate.
Figure 7:
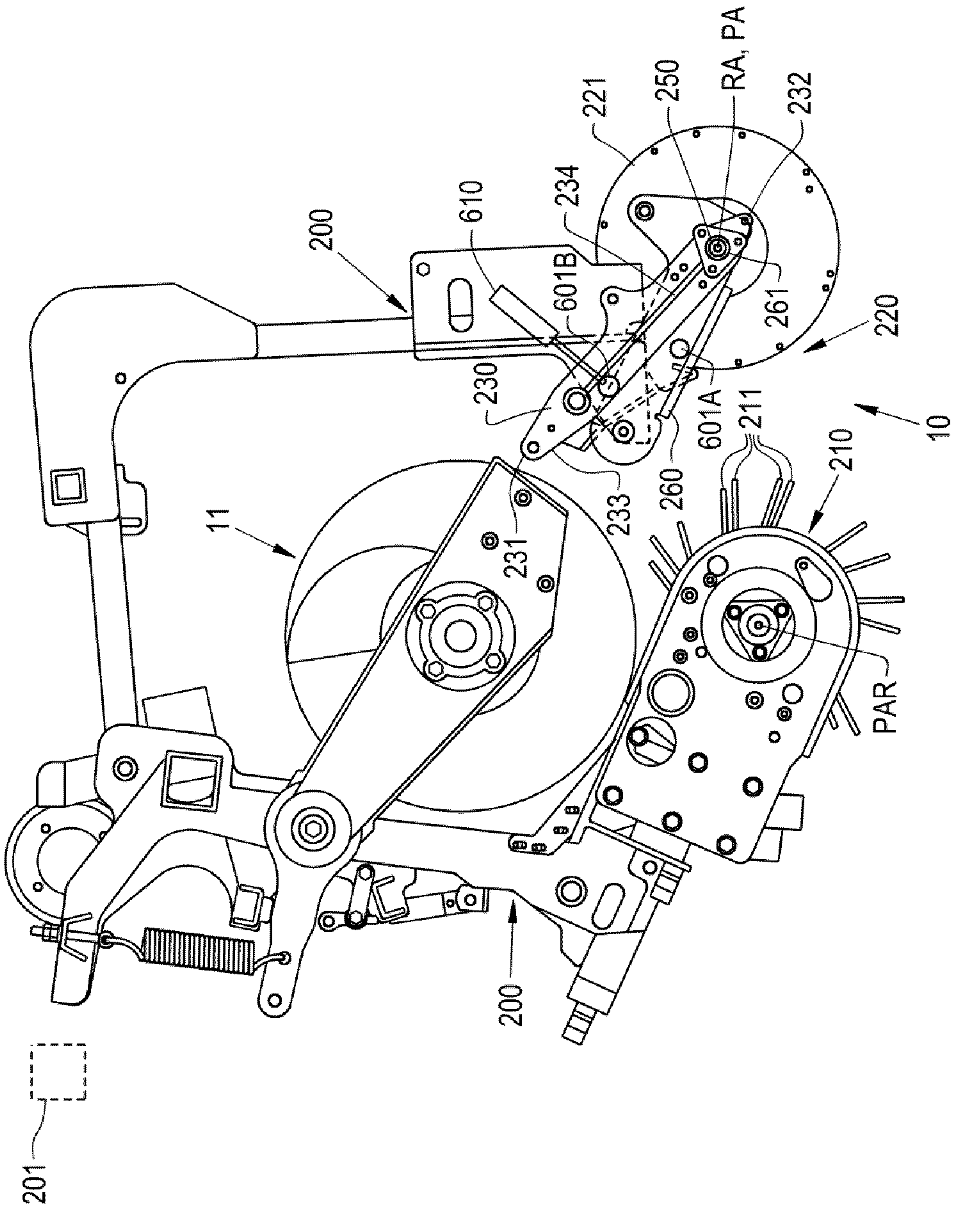
FIG. 7 is a side view of the material conveyor and the pickup assembly of FIG. 5 after one of the stops has been moved to adjust a maximum pivoting position of the guidance plate.

Referring now to FIGS. 6-7, a pair of stops 601A, 601B are illustrated that can limit pivoting movement of the guidance plate 230. It should be appreciated that while two stops 601A, 601B are illustrated and described, in some embodiments only one stop is utilized or more than two stops may be provided, i.e., at least one stop 601A, 601B may be provided according to the present disclosure. The guidance plate 230 may carry a stop rail 234 that abuts against one of the stops 601A, 601B, depending on a position of the guidance plate 230, to prevent the guidance plate 230 from pivoting past the stops 601A, 601B. As illustrated, the lower stop 601A is below the guidance plate 230 and may represent a minimum pivot stop due to the guidance plate 230 being urged downwardly by gravity and the upper stop 601B is above the guidance plate 230 and may represent a maximum pivot stop to prevent excessive pivoting of the guidance plate 230 due to the force from incoming crop material. In other words, the lower stop 601A controls a minimum pivoting position of the guidance plate 230 and the upper stop 601B controls a maximum pivoting position of the guidance plate 230. It should be appreciated that the terms "minimum" and "maximum", with respect to the pivoting position of the guidance plate 230, is in the context of pivoting due to crop material forcing pivoting of the guidance plate 230, i.e., the minimum pivoting position may be the natural position of the guidance plate 230 when incoming crop material has not forced the guidance plate 230 to pivot upwardly. By including the stops 601A, 601B, the pivoting movement range of the guidance plate 230 can be precisely controlled and prevent damage to the pickup assembly 10 due to excessive movement of the guidance plate 230.

In some embodiments, a stop actuator 610 is provided that movably couples the one or more stops 601A, 601B to the frame 200 and is configured to move the stop(s) 601A, 601B relative to the frame 200 and adjust the minimum pivoting position and/or the maximum pivoting position, depending on which stop(s) 601A, 601B is moved. As illustrated in FIGS. 6-7, a single stop actuator 610 is illustrated that couples the upper stop 601B to the frame 200, but it should be appreciated that the stop actuator 610 can also couple to the lower stop 601A or another stop actuator may be coupled to the lower stop 601A to adjust the position of the lower stop 601A. In some embodiments, the lower stop 601A is carried by the arm 260 so movement of the arm 260 adjusts the position of the lower stop 601A and thus the minimum pivoting position. Adjusting the minimum pivoting position and/or the maximum pivoting position using the stop actuator 610 can adjust the crop material feed to the crop material conveyor 11 by controlling an orientation and pivot range of the guidance plate 230, providing more adjustability. It should be appreciated that while the stops 601A, 601B are described as being adjustable using the stop actuator 610, in some embodiments one or more of the stops 601A, 601B is manually or otherwise adjustable to adjust the respective pivoting position, i.e., the stop actuator 610 is not necessary to adjust the position of one or more of the stops 601A, 601B.

A controller, such as the previously described controller 201, may be operably coupled to the stop actuator 610 and configured to output a stop adjustment signal that causes the stop actuator 610 to move the one or more stops 601A, 601B. The controller 201 may be configured to receive input from a user, for example, via a coupled control device in an operator cab of the vehicle 1 and/or remotely, e.g., from an application used on a smartphone, and responsively output the stop adjustment signal so one or more of the stops 601A, 601B is correspondingly adjusted. For example, a user may directly control the controller 201 to output the stop adjustment signal so the stop actuator 610 lowers the maximum pivoting position from the position illustrated in FIG. 6 to the position illustrated in FIG. 7. In this sense, the user may manually adjust the minimum pivoting position and/or the maximum pivoting position via the controller 201 and the stop actuator 610.

In some embodiments, a pressure sensor 620 is associated with the pickup drum 210 and/or an angle sensor 630 is associated with the guidance plate 230. The pressure sensor 620 is operably coupled to the controller 201 and configured to output a pressure signal corresponding to a pressure on the pickup drum 210 to the controller 201, which can correspond to pressure exerted on the pickup drum 210 by incoming crop material. The angle sensor 630 is operably coupled to the controller 201 and is configured to output a plate angle signal corresponding to an angle of the guidance plate 230. The controller 201 may be configured to receive the pressure signal and/or the plate angle signal and output the stop adjustment signal based at least partially on the received pressure signal and/or plate angle signal. For example, the controller 201 may be configured to define a maximum pressure and/or a minimum pressure for a defined angle of the guidance plate 230. If the controller 201 determines that the pressure exerted on the pickup drum 210 falls outside the range between the maximum pressure and minimum pressure for the current angle of the guidance plate 230, the controller 201 may automatically output the stop adjustment signal so the stop actuator 610 adjusts one or more of the stops 601A, 601B accordingly. The defined maximum pressure, minimum pressure, and/or angle of the guidance plate 230 may be chosen so there is always a speed difference between the crop material moving against the guidance plate 230 and the crop material moving against guards of the pickup drum 210. In this respect, the controller 201 may monitor the pressure exerted on the pickup drum 210 by incoming crop material and/or the angle of the guidance plate 230 and adjust the stop(s) 601A, 601B accordingly to maintain smooth crop flow toward the crop material conveyor 11.

From the foregoing, it should be appreciated that the pickup assembly 10 provided according to the present disclosure has a guidance plate 230 that can float without adjusting the position of the roller 221 to exert pressure on crop material being fed toward the crop material conveyor 11. The guidance plate 230 may have a roughened surface 233 that helps strip crop material from the tines 211 and reduce the risk of clogs developing during harvesting. Further, the movement range of the guidance plate 230 may be controlled by one or more stops 601A, 601B, which can assist in controlling the floating behavior of the guidance plate 230 to encourage smooth crop material flow to the crop material conveyor 11. Therefore, the pickup assembly 10 provided according to the present disclosure can reduce the risk of clogs developing as crop material is fed to the crop material conveyor 11 and the associated downtime with clearing the clogs and/or having to drive over crop material that was not collected as a result of the clogs.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A pickup assembly for an agricultural vehicle, the pickup assembly comprising:
- a frame;
- a pickup drum carried by the frame and carrying a plurality of tines;
- a windguard assembly carried by the frame and comprising a roller carried in front of the pickup drum and defining a roller axis;
- a guidance plate being pivotable about a pivot axis that is coaxial with the roller axis, the guidance plate having a surface facing the tines; and
- a plate resistor that resists pivoting of the guidance plate about the pivot axis, the plate resistor coupled to the guidance plate on one end and to the frame on the other end;
- wherein the surface of the guidance plate is a roughened surface facing the tines that strips crop material from the tines.

2. The pickup assembly of claim 1, wherein the plate resistor comprises at least one of a hydraulic cylinder or a spring.

3. The pickup assembly of claim 1, further comprising a pivot pin extending along the roller axis, the guidance plate being pivotably coupled to the pivot pin.

4. The pickup assembly of claim 3, further comprising an arm coupled to the frame and comprising a pin opening in which the pivot pin is partially disposed.

5. The pickup assembly of claim 1, further comprising at least one stop that stops the pivoting of the guidance plate at an at least one of a minimum pivoting position or a maximum pivoting position.

6. The pickup assembly of claim 5, further comprising a stop actuator movably coupling the at least one stop to the frame and moving the at least one stop relative to the frame and adjust at least one of the minimum pivoting position or the maximum pivoting position.

7. The pickup assembly of claim 6, further comprising a controller that outputs a stop adjustment signal causing the stop actuator to move the at least one stop.

8. The pickup assembly of claim 7, further comprising at least one of:
- a pressure sensor associated with the pickup drum, operably coupled to the controller, and that outputs a pressure signal corresponding to a pressure on the pickup drum to the controller; or
- an angle sensor associated with the guidance plate, operably coupled to the controller, and that outputs a guidance plate angle signal corresponding to an angle of the guidance plate;
- wherein the controller receives the pressure signal and/or the plate angle signal and outputs the stop adjustment signal based at least partially on the received pressure signal and/or plate angle signal.

9. An agricultural vehicle comprising:
a chassis;
a crop material conveyor carried by the chassis; and
a pickup assembly carried by the chassis and moves crop material from the ground toward the crop material conveyor, the pickup assembly comprising:
a frame;
a pickup drum carried by the frame and carrying a plurality of tines;
a windguard assembly carried by the frame and comprising a roller carried in front of the pickup drum and defining a roller axis;
a guidance plate being pivotable about a pivot axis that is coaxial with the roller axis, the guidance plate having a surface facing the plurality of tines that directs the crop material that is picked up by the plurality of tines towards the crop material conveyor; and
a plate resistor that resists pivoting of the guidance plate about the pivot axis, the plate resistor coupled to the guidance plate on one end and to the frame on the other end;
wherein the surface of the guidance plate is a roughened surface facing the tines that strips crop material from the tines.

10. The agricultural vehicle of claim 9, wherein the crop material conveyor is an auger.

11. The agricultural vehicle of claim 9, wherein the agricultural vehicle is a forage harvester, a large square baler, a small square baler, or a round baler.

12. The agricultural vehicle of claim 9, wherein the pickup assembly further comprises a pivot pin extending along the roller axis, the guidance plate being pivotably coupled to the pivot pin.

13. The agricultural vehicle of claim 12, wherein the pickup assembly further comprises an arm coupled to the frame and a pin opening in which the pivot pin is partially disposed.

14. The agricultural vehicle of claim 9, wherein the pickup assembly further comprises at least one stop that stops the pivoting of the guidance plate at an at least one of a minimum pivoting position or a maximum pivoting position.

15. The agricultural vehicle of claim 14, wherein the pickup assembly further comprises a stop actuator movably coupling the at least one stop to the frame and that moves the at least one stop relative to the frame and adjusts at least one of the minimum pivoting position or the maximum pivoting position.

* * * * *